(12) United States Patent
Degler et al.

(10) Patent No.: US 8,261,900 B2
(45) Date of Patent: Sep. 11, 2012

(54) WET CLUTCH

(75) Inventors: Mario Degler, Baden-Baden (DE); Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/102,500

(22) Filed: May 6, 2011

(65) Prior Publication Data

US 2011/0203895 A1    Aug. 25, 2011

Related U.S. Application Data (63) Continuation of application No. PCT/DE2009/001535, filed on Oct. 29, 2009.

(30) Foreign Application Priority Data

Nov. 10, 2008  (DE) .......................... 10 2008 056 637

(51) Int. Cl.
*F16D 25/0638* (2006.01)
*F16D 13/40* (2006.01)
*F16H 45/02* (2006.01)

(52) U.S. Cl. ................. 192/85.24; 192/3.3; 192/70.12; 192/113.34

(58) Field of Classification Search ............ 192/113.35, 192/85.2, 58.42, 58.43

See application file for complete search history.

(56) References Cited

U.S. PATENT DOCUMENTS

| | | | | |
|---|---|---|---|---|
| 3,266,608 A | * | 8/1966 | Lemieux | ................. 192/85.34 |
| 6,394,243 B1 | * | 5/2002 | Sasse | .................... 192/3.29 |

FOREIGN PATENT DOCUMENTS

| | | |
|---|---|---|
| DE | 19917893 | 10/2000 |
| DE | 10350935 | 5/2004 |
| EP | 1469231 | 10/2004 |

* cited by examiner

*Primary Examiner* — Rodney Bonck
(74) *Attorney, Agent, or Firm* — Simpson & Simpson, PLLC (57) ABSTRACT

A wet clutch comprising at least one friction disk (10) which is loaded by a piston (5) against an end disk (4). In order to run a forced pressure medium flow over the friction surfaces (11, 12) of the wet clutch, two pressures cavities (7, 8) having a connection in the region of the friction surfaces, are loaded with varying pressures. In order to improve such arrangements, the invention proposes that the leakage flow flowing over the supports of the friction disks is limited.

13 Claims, 7 Drawing Sheets

Fig. 7

WET CLUTCH

CROSS-REFERENCE TO RELATED APPLICATIONS

This application is filed under 35 U.S.C. §120 and §365(c) as a continuation of International Patent Application No. PCT/DE2009/001535 filed Oct. 29, 2009 which application claims priority from Germany Patent Application No. 10 2008 056 637.3 filed on Nov. 10, 2008 which applications are incorporated herein by reference in their entirety.

FIELD OF THE INVENTION

The invention relates to a friction clutch including at least one friction disk that is loaded by a piston relative to an end disk.

BACKGROUND OF THE INVENTION

Wet clutches of this type have been known in the art for quite a while as converter lock up clutches in hydrodynamic torque converters or as single or twin clutches in a drive train between drive units and transmissions of motor vehicles. Friction energy is generated in particular during slippage of the wet clutch at the friction surfaces providing frictional engagement for the wet clutch. The friction energy heats up the friction surfaces which can damage or destroy the friction liners provided at the friction surfaces and possibly also friction medium that are not integrated in the flow.

Therefore friction liners are being proposed which include grooves with a radial portion so that a pressure medium flow is provided for a defined pressure gradient between a portion radially outside of the friction surfaces and a radially inner portion. The pressure medium flow provides a cooling for the friction surfaces. In order to establish a pressure gradient two pressure cavities can be configured on both sides of the friction surfaces. The pressure cavities are loaded with a variable pressure from the pressure medium. Thus, leakage flows in particular for not yet completely compressed friction surfaces can reduce the pressure medium flow over the friction surfaces during a slippage of the wet clutch during which a forced pressure medium flow due to an increased heat introduction in this operating condition is particularly important.

BRIEF SUMMARY OF THE INVENTION

Thus it is an object of the invention to propose a wet clutch which has reduced leakage flows.

The object is achieved through a wet clutch with at least one friction disk that is disposed in a housing and loaded by an axially displaceable piston against an end disk forming a reaction bearing with respect to the piston. The friction disk is supported torque-proof radially within friction surfaces forming a frictional engagement between the at least one friction disk, the piston and the end disk for a closed wet clutch. The torque-proof support is provided through a profile like an outer or inner teething at a complementary profile of an output component of the wet clutch. The friction surfaces define two pressure cavities at least in a non-open condition of the wet clutch, so that a forced pressure medium flow is run over the friction surfaces by adjusting various pressures of the pressure medium and a leakage flow between the two pressure cavities over the profiles is limited by at least one seal device. When using plural friction disks they, for example, arranged in an alternating manner on the input side and on the output side. The input side friction disks can be engaged at the housing respectively torque-proof and axially moveable within limits. A respective friction disk can include a metal surface and a complementary friction surface with a friction liner. The friction liners can be arranged preferably on both sides at the friction disks arranged on the output side. In an example embodiment, the friction liners are so-called paper liners which can include grooves with a radial component in order to provide a pressure medium flow. An open wet clutch is in an operating condition in which the wet clutch does not transfer any torque. A wet clutch that is not open therefore includes a slipping condition in which a partial moment is already being transferred and it includes the closed condition without any substantial slippage. Since no friction heat is generated when the wet clutch is open a leakage flow can be tolerated in this condition and/or the pressure difference between the two pressure cavities can be set to zero so that neither a forced pressure medium flow over the friction surfaces nor leakage flows are generated. According to the invention leakage flows are eliminated in particular or at least reduced when a forced pressure medium flow over the friction liners, for example, for cooling the friction liners and/or for protecting the pressure medium is required for a slipping or closed wet clutch.

The wet clutch is driven on the input side by the housing which is coupled with a drive unit like an internal combustion engine. The output component of the wet clutch can transfer a torque that is controlled by the wet clutch to another output component as a function of an operating condition. In an example embodiment, the wet clutch is used in a torque converter. The torque is transferred to an output hub with a torsion vibration damper connected there between when the torque converter is intentionally locked up and subsequently transmitted to a transmission input shaft. Thus, the input component of the torsion vibration damper and the output component of the wet clutch can be configured integral in one piece. In order to transfer torque the at least one friction disk and the output component can be coupled torque proof, e.g. through a profile like an inner teething or outer teething and a profile complementary thereto.

Alternatively, the output component and the input component or another output component can be configured separately from one another and can be connected with one another like e.g. riveted together, wherein the output component of the friction clutch is configured as a disk support in this case, wherein the disk support centers the at least one friction disk and receives it torque-proof.

In an example embodiment, driving the at least one friction disk torque-proof through the output component provides high leakage flows, so that the seal device according to the invention is arranged between the output component and the at least one friction disk. Thus, a sealing surface can be provided radially within the friction surfaces at the side oriented towards the output component of the friction disk adjacent to the output component. A complementary seal surface at the output component is associated with the seal surface the friction disk. The seal device is arranged between the two seal surfaces. In an example embodiment, the output component of the wet clutch and the input component of the torsion vibration damper or the other output component, the complementary seal surface can be provided at these components.

In an example embodiment, the serial flow-through is provided for the friction surfaces between plural friction disks or for the outer friction disks between the piston and the friction disk or the end disk and the friction disk. Thus, for plural friction disks that are e.g. arranged in an alternating manner on the input side and on the output side an input side friction disk that is connected torque-proof with the housing on the radial outside can include a seal device to the end disk and the radially inner friction disks can include respective seal devices relative to one another or to the output component or the input component. When using plural input side friction disks, seal devices can also be provided between the friction disks.

In order to furthermore eliminate or exclude a leakage between the end disk, which, in an example embodiment is received axially fixated and torque-proof at the housing, the end disk can be sealed relative to the housing e.g. in axial and/or radial direction.

The sealing devices for sealing leakage flows can be radial and/or axial sealing devices, thus a seal device can be provided, for example, for sealing components that are movable relative to one another in axial directions within limits. The seal device maintains its sealing properties at least over a portion of the axial travel. For example, in order to compensate for the axial travel of the at least one friction disk between an open and a closed operating condition of the wet clutch, a seal device can be provided that has elastic properties in axial direction, which facilitate a seal function at least in closed and slipping operating condition of the wet clutch. The seal function can be removed in closed condition so that the requirements with respect to an axial elasticity of the seal device can be engineered accordingly and focused on the seal function. A sealing device of this type can be formed e.g. from a disk spring and/or a seal membrane which contact under an axial preload at least the slipping and closed operating conditions of the wet clutch at both seal surfaces of the adjacent friction disk on the one hand side and the output component of the wet clutch or the input component of the torsion vibration damper or another output component on the other hand side. Alternatively the at least one seal device can be an elastomeric seal which is arranged between these components in the same manner. Another advantageous embodiment of a seal device includes a flow through limiter, e.g. a filter, a disk with a nozzle or similar. It is appreciated that the seal devices can be advantageously provided in the same manner for the other seal position like between the friction disks between a friction disk and the end disk and similar.

An advantageous embodiment with a disk support that is connected with an output component like an input component of a torsion vibration damper can provide a seal device which is formed by a seal plate which is attached between the disk support and the output component, wherein the seal device forms a seal surface to the at least one friction disk. Alternatively the seal plate can be centered on the output component in an axially floating manner, wherein the seal plate is e.g. axially loaded against the output component through an axially effective energy storage device like a disk spring and forms a seal surface to the at least one friction disk. The seal surfaces of the seal plates can thus be adjusted with respect to an axial preload against the seal surface at the friction disk so that a gap is created for an open operating condition of the wet clutch so that a detrimental friction torque is not provided in an open operating condition.

BRIEF DESCRIPTION OF THE SEVERAL
VIEWS OF THE DRAWING

The nature and mode of operation of the present invention will now be more fully described in the following detailed description of the invention taken with the accompanying drawing figures, in which.

DETAILED DESCRIPTION OF THE INVENTION

Figure 1:
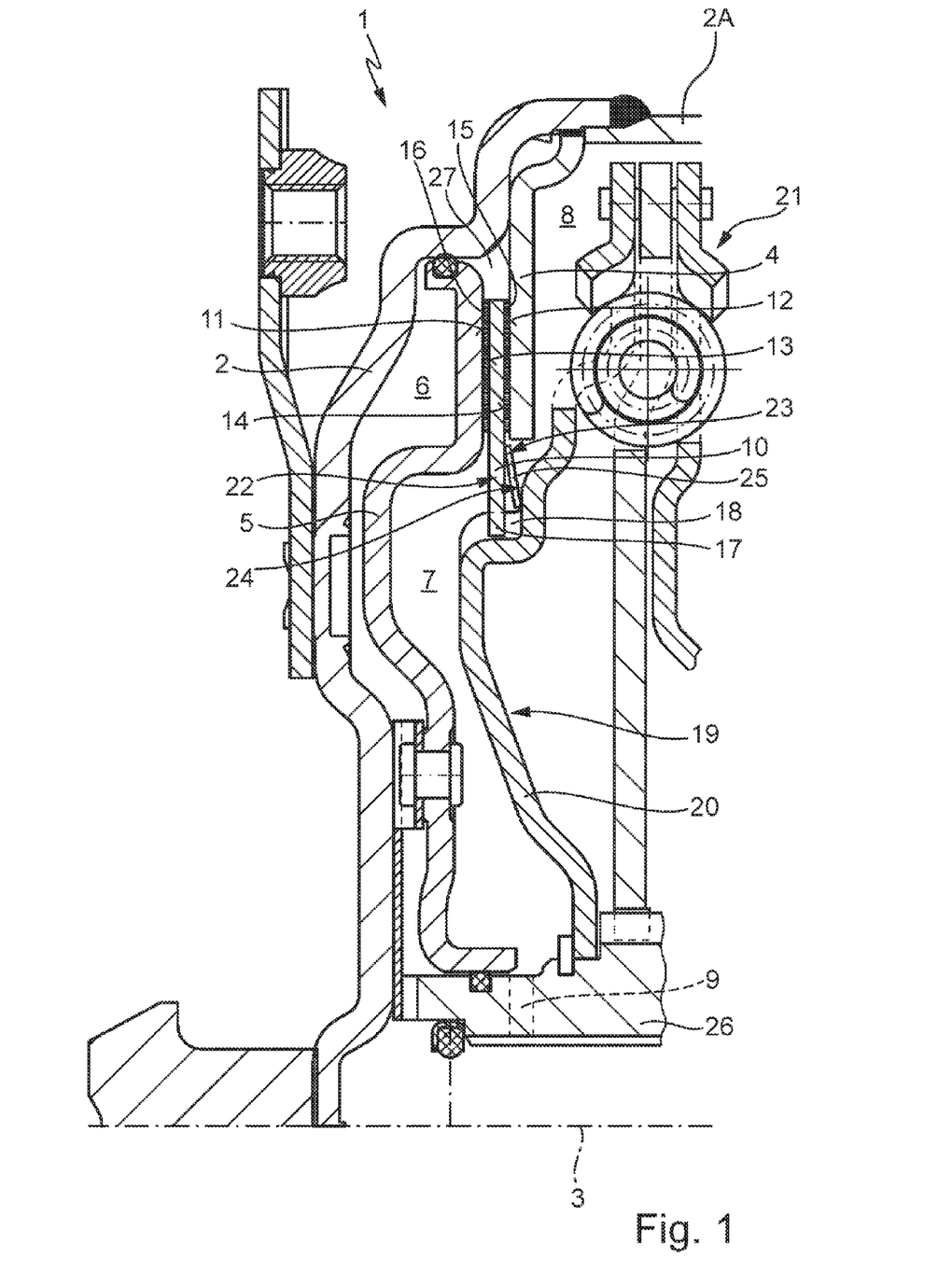
FIGS. 1 through 7 illustrate respective embodiments of wet clutches with a forced pressure medium flow between two pressure cavities over the friction surfaces of the wet clutch.

FIG. 1 illustrates the upper half of the wet clutch 1 arranged in a housing 2, housing 2A, and about a rotation axis 3 in a sectional view. The housing 2 is driven by a drive unit which is not illustrated, e.g. an internal combustion engine and introduces a torque through the end disk 4 permanently connected with the housing 2 and the piston 5 connected with the housing 2 in a torque-proof and axially movable manner. The housing includes three pressure cavities 6, 7, 8 which are loadable with pressure independently from one another through a pressure supply device like a pump and respective switch valves. Thus, plural supply lines that are not illustrated and respective outlets are provided between the transmission, which is not illustrated, and the pressure cavities 6, 7, 8. For example a supply line or an outlet is connected through a pass through 9 with the pressure cavity 7. When the pressure of the pressure cavity 6 increases relative to the pressure cavity 7, the piston 5 is axially moved and loads a particular friction disk 10 against the end disk 4 as illustrated in this embodiment. Consequently, a frictional engagement between the friction surfaces 11, 12 and the friction surfaces 13, 14 of the piston 5 and the end disk 4 is provided. Thus, the friction surfaces 11, 12 of the friction disk 10 are formed by friction liners 15, 16 which are applied to the friction disk 10 on both sides and include grooves with a radial portion which are not illustrated through which a forced pressure medium flow runs for a pressure difference between the pressure cavities 7, 8.

The friction disk 10 is engaged torque proof through a profile 17 like e.g. an inner teething in a complementary profile 18 like e.g. an outer teething. The profile 18 is arranged at an output component 19 which is the input component 20 of a torsion vibration damper 21 in the illustrated embodiment. In order to prevent a leakage flow and thus a reduction of the forced pressure medium flow over the friction surfaces 11, 12, 13, 14 a seal device 22 is provided in the illustrated embodiment, wherein the seal device seals the leakage caused by the profiles 17, 18 at least for a slipping or closed wet clutch. Thus, annular seal surfaces 23, 24 are provided radially within the friction liners 15, 16 at the friction liner 10 and the output component 19, wherein the disk spring 25 contacts the annular seal surfaces in a preloaded condition of the disk spring. The spring characteristics of the disk spring 25 centered at the profile 18 can thus be configured so that no preload or only a low preload is provided when the wet clutch 1 is open. This way a load moment of the wet clutch caused by a friction of a friction disk 10 and an output component 19 rotating relative to one another is reduced or eliminated for an open wet clutch 1.

Furthermore, the two pressure cavities 7, 8 are separated from one another through the end disk 4, the output component 19 and the output hub 26. The forced pressure medium flow can be generated by a positive pressure in the pressure cavity 7 or the pressure cavity 8. For a positive pressure in the pressure cavity 8 the pressure medium is initially pressed from the radial inside through the friction liner 15 into the intermediary space 27 and from there in radially inward direction through the friction liner 16 into the pressure cavity 7 and let out through the pass through 9. The pressure medium flow is provided through the positive pressure in the pressure cavity 7 in opposite direction radially outward through the friction liner 16 into the intermediary space 27 and from there in radially inward direction through the friction liner 15 into the pressure cavity 8 which can be e.g. a converter cavity with a turbine shell and a pump shell. In order to obtain even cooling effects of both serially flowed friction liners an alternating pressure loading of the pressure cavity 7, 8 with higher pressure can be provided.

Figure 2:
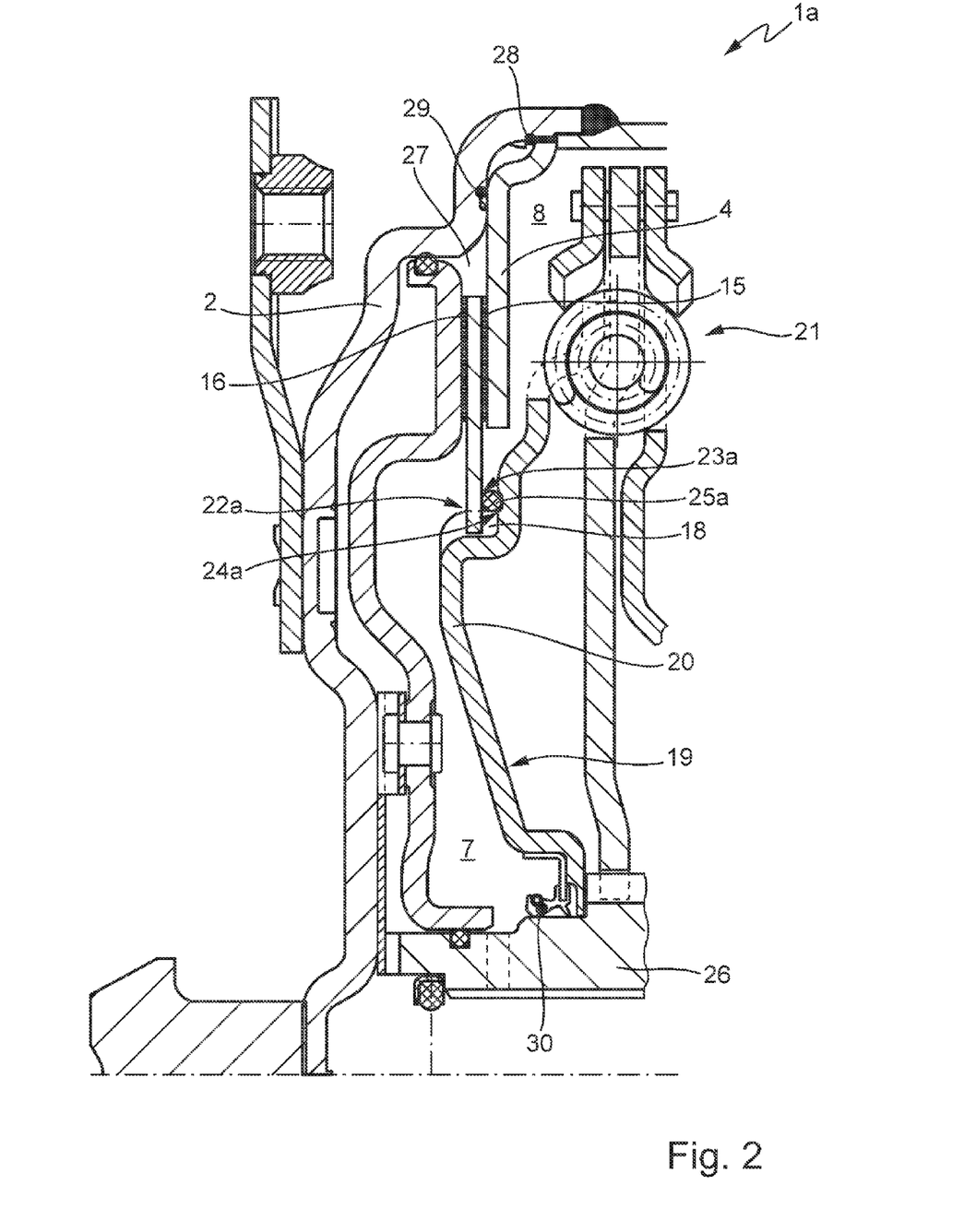

FIG. 2 provides a wet clutch 1*a* that is configured similar to the wet clutch 1 of FIG. 1, wherein the wet clutch 1*a* includes a seal device 22*a* that is formed from an elastomeric seal which is different from the seal device 22 in FIG. 1. This can be a seal ring 25*a* made from an elastic plastic material, e.g. Viton®, EPDM or similar whose elasticity is advantageously configured so that a gap to one or both seal surfaces 23*a* or 24*a* is formed for an open wet clutch 1*a*. The seal ring 25*a* e.g. configured as an elastomeric seal is centered on the profile 18.

In order to increase the forced pressure medium flow through the friction liners 15, 16 the end disk 4 can be sealed on the radial outside through the seal 28 or through an axially effective seal 29 towards the housing 2. This way the pressure cavity 8 is sealed better relative to the intermediary cavity 27 so that a pressure gradient between the intermediary cavity 27 and the pressure cavity 8 is maintained which is necessary for maintaining the pressure medium flow through the friction liner 15. It is appreciated that a respective seal can be omitted for a tight connection between an end disk 4 and the housing 2. In order to increase the sealing between the two pressure cavities 7, 8 a seal 30 can be arranged between the output component 19 and the output shaft 26, wherein the seal is advantageously configured as a shaft seal 30 as illustrated for a configuration of the output component 19 as an input component 20 of the torsion vibration damper 21, wherein the input component is centered and rotatably received on the output hub 26.

Figure 3:
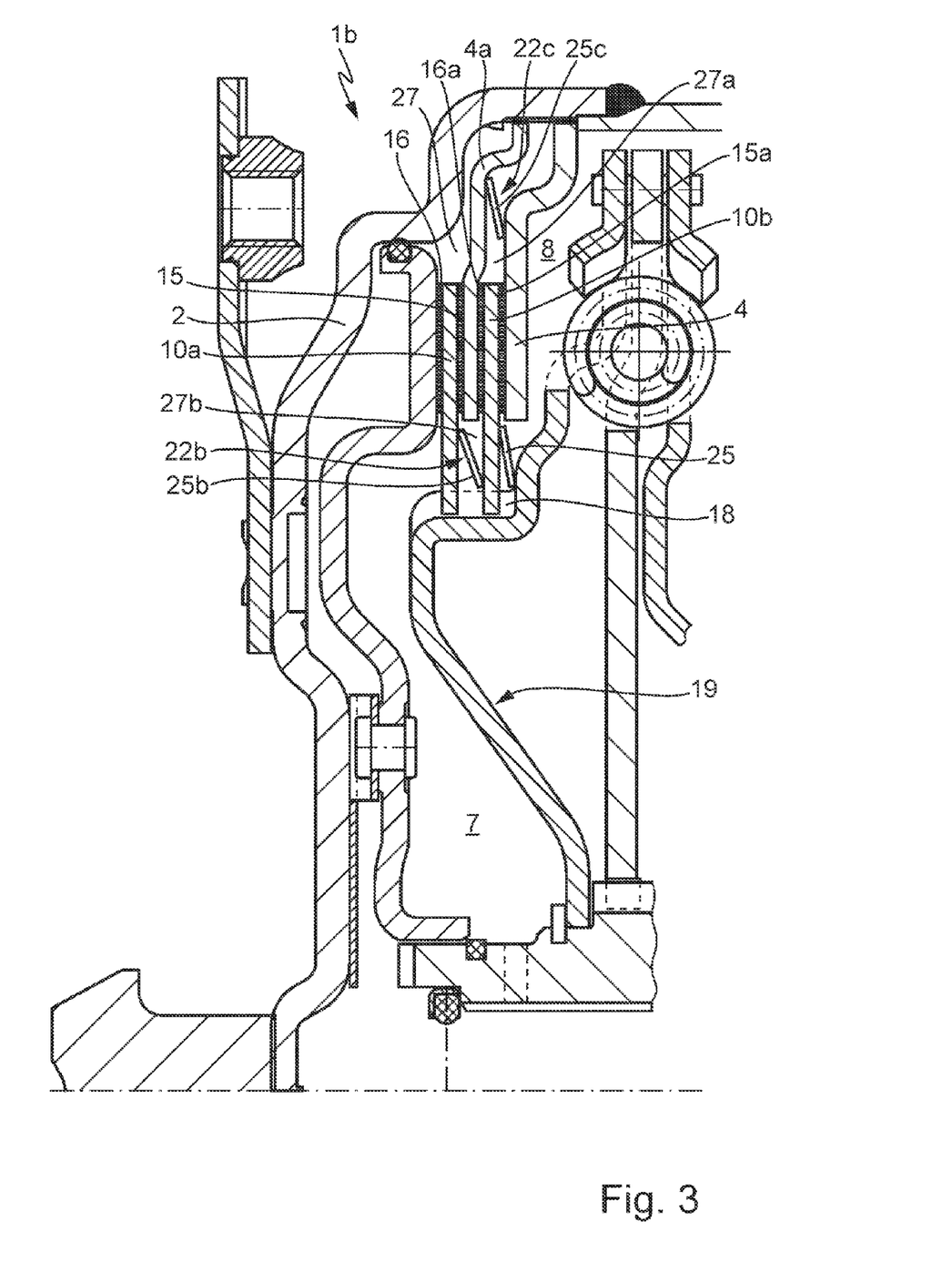

FIG. 3 illustrates an embodiment of a wet clutch 1*b* in which contrary to the wet clutches 1, 1*a* of FIGS. 1 and 2 plural, thus output side friction disks 10*a*, 10*b* are provided between which an input side friction disk 4*a* is arranged that is torque-proof with the housing and movable within limits in axial direction. The two pressure cavities 7, 8 as illustrated in FIG. 1 are sealed through the disk spring 25 between the friction disk 10*b* adjacent to the output component 19 with an axially broadened profile 18 for accordingly receiving two friction disks 10*a*, 10*b* and the output component 19. In order to obtain a serial flow through of the friction liners 15, 15*a*, 16, 16*a* furthermore a seal device 22*b* is provided between the two friction disks 10*a*, 10*b* and another seal device 22*c* is provided between the end disk 4 and the friction disk 4*a* radially outside of the friction liners 15, 15*a*, 16, 16*a* so that two intermediary cavities 27, 27*a* are formed.

This provides a forced pressure medium flow through the friction liner 15*a* into the intermediary cavity 27*a* for a pressure in the pressure cavity 8 that is higher than a pressure in the pressure cavity 7. The disk spring 25*c* prevents a transition of the pressure medium between the friction disk 4*a* and the housing 2 into the intermediary space 27 so that the pressure medium is pressed from the intermediary space 27*a* through the friction liner 16*a* into the intermediary space 27*b* arranged within the friction liners. The disk spring 25 prevents a direct transition of the pressure medium into the pressure cavity 7. Therefore the pressure medium flows from the intermediary space 27*b* through the friction liner 15 and subsequently through the friction liner 16 into the pressure cavity 7. For a pressure reversal the pressure medium takes a reverse path through the intermediary cavities 27, 27*a*, 27*b* and the friction liners 15, 15*a*, 16, 16*a*.

Figure 4:
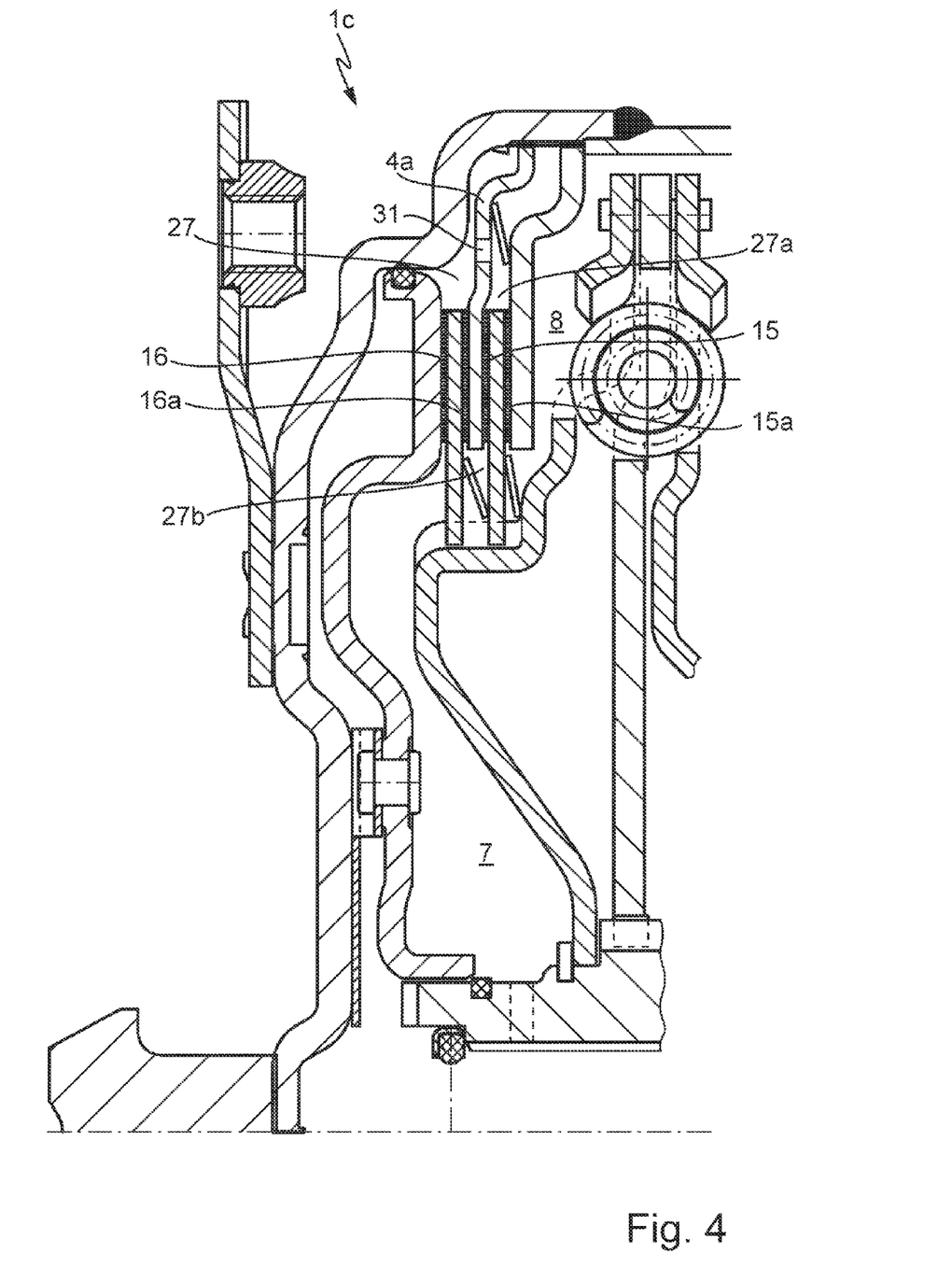

FIG. 4 illustrates a wet clutch 1*c* that is similar to the wet clutch 1*b* of FIG. 3 with the difference that at least one opening 31 is provided in the friction disk 4*a*, wherein the opening connects the intermediary spaces 27, 27*a* with one another. Consequently the friction liners 15, 15*a*, 16, 16*a* are flowed through partially in series and partially in parallel. For example the friction liners 15, 16 can be flowed through in parallel for a positive pressure in the pressure cavity 8 after a flow through of the friction liner 15*a*, while the friction liner 16*a* is flowed through serially after the friction liners 15, 15*a* by a partial flow of the pressure medium which initially flows through the friction liner 15 and fills the intermediary space 27*b*.

Figure 5:
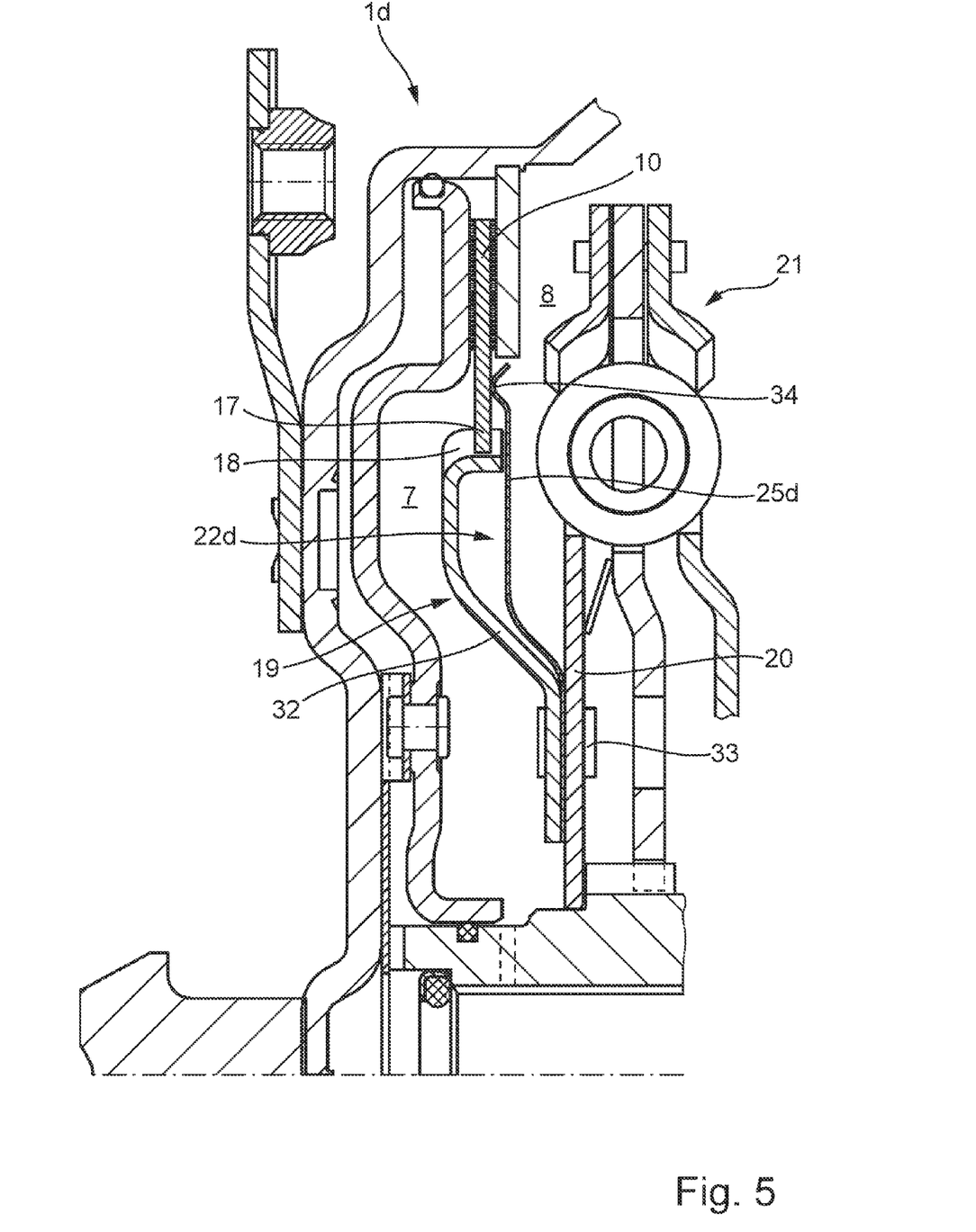

FIG. 5 illustrates a wet clutch 1*d* that is modified relative to the preceding wet clutches 1, 1*a*, 1*b*, 1*c* in which the output component 19 is formed by the disk support 32. The disk support 32 is connected torque-proof with the input component 20 of the torsion vibration damper 21 in the illustrated embodiment, e.g. as illustrated herein riveted together through rivets 33. The seal device 22*d* between the two pressure cavities 7, 8 is formed in the illustrated embodiment through a seal plate 25*d* which is axially mounted between the input component 20 and the disk support 32 through rivets 33 and includes a seal surface 34 on a radial outside towards the friction disk 10, wherein the seal surface contacts under a preload for a slipping or closed wet clutch 1*d* and seals a leakage that occurs through the profiles 17, 18.

Figure 6:
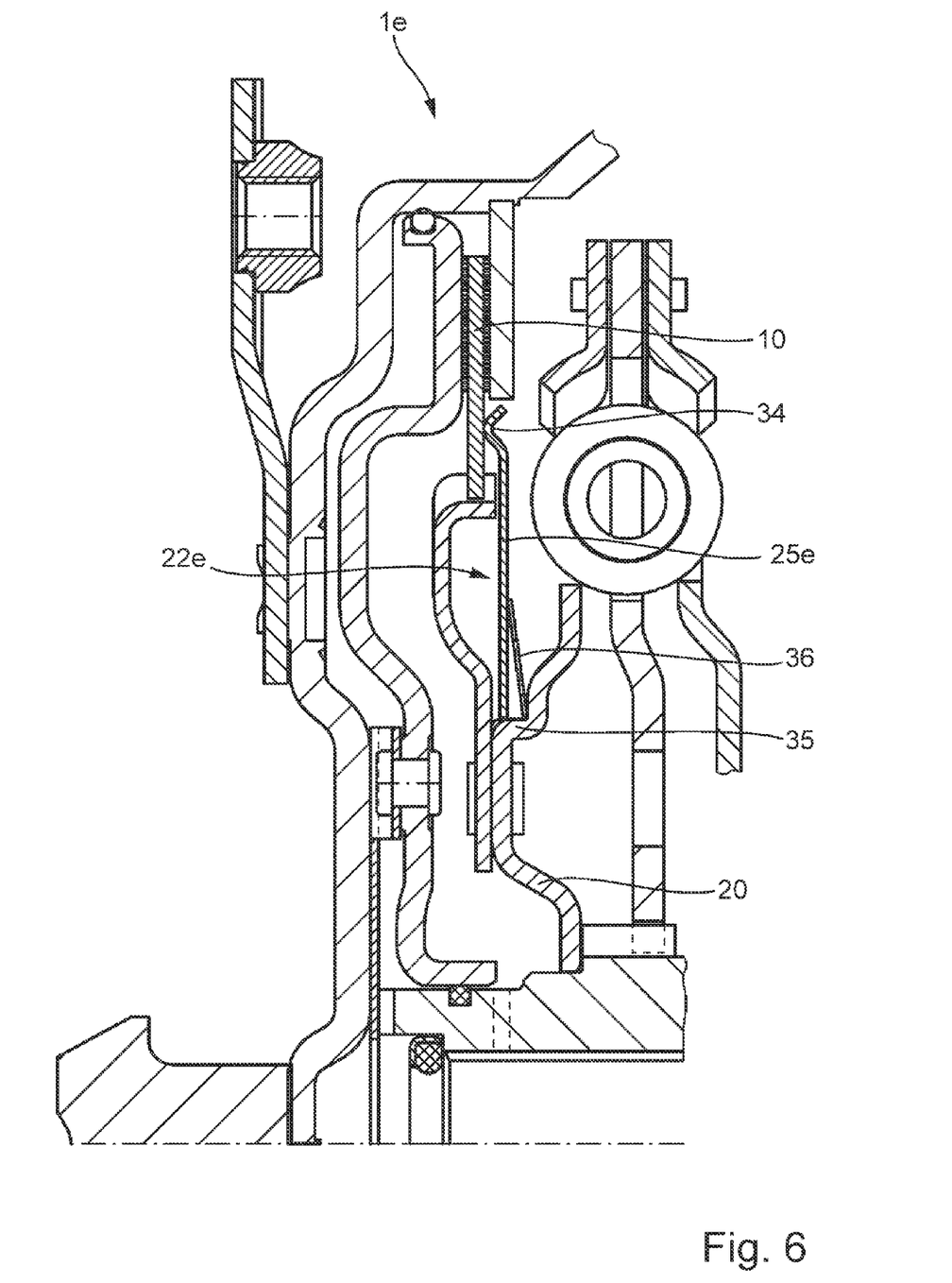

FIG. 6 thus illustrates a modified embodiment of a wet clutch 1*e* that is similar to the wet clutch 1*d* according to FIG. 5 with the difference that the seal device 22*e* in the form of the seal plate 25*e* is centered in a floating manner on the axial onset of the input component 20 and preloaded through the energy storage device 36 that is effective in an axial direction and centered on the onset 35, wherein the energy storage device is e.g. configured as a disk spring that is preloaded at least for a slipping or closed wet clutch 1*e* through the seal surface 34 against which the friction disk 10 is preloaded.

Figure 7:
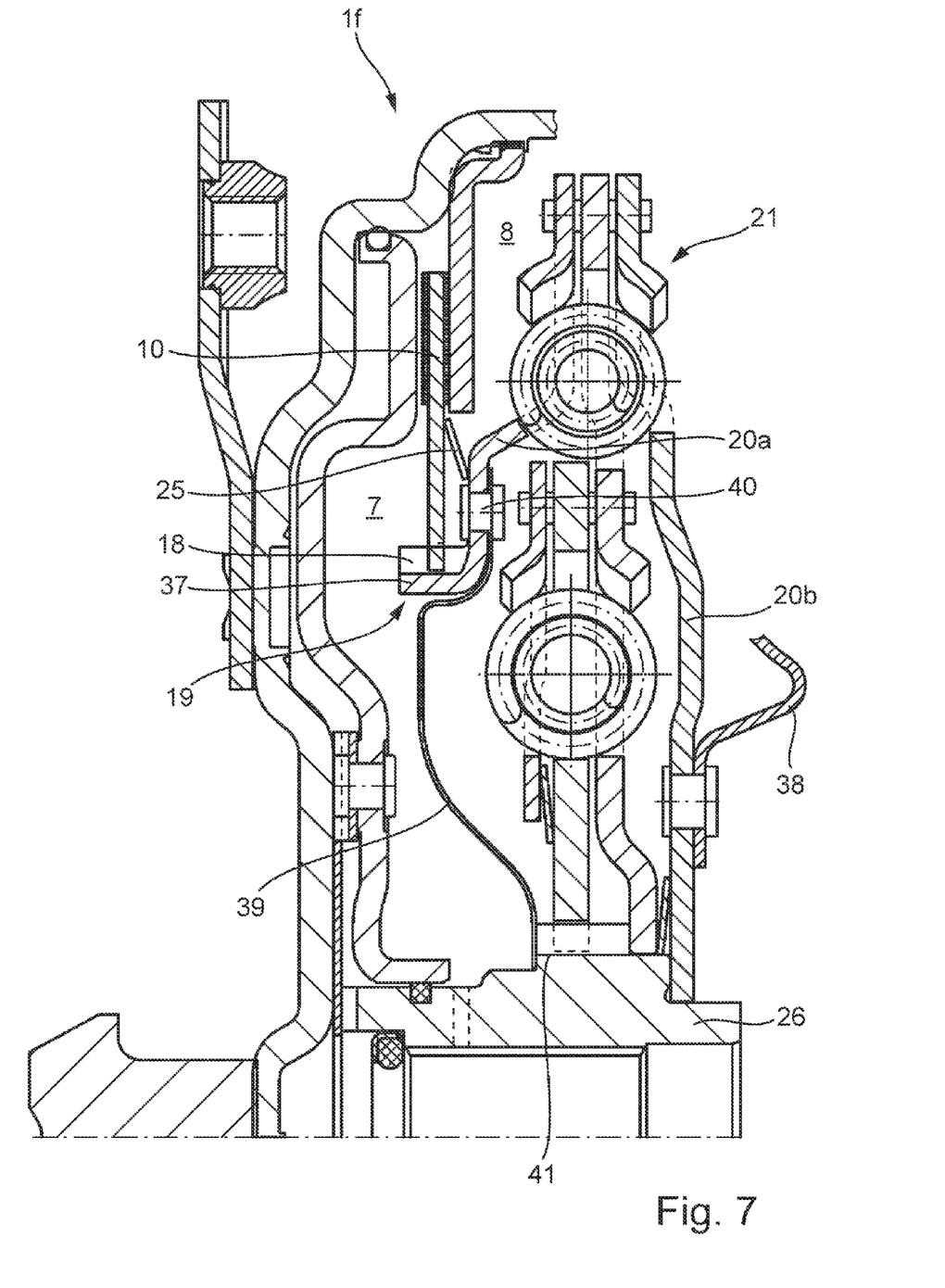

FIG. 7 illustrates an alternative embodiment of a wet clutch 1*f* in which the disk component 20*b* connected with the input component 20*a* and riveted together with the turbine shell 38 of a torque converter, wherein the turbine shell is only indicated, is centered on the drive hub 26, so that the input component 20*a* shall be illustrated in a radially shortened manner contrary to the input components 20 of FIGS. 1, 5 and 6. An axial onset 37 of the input component 20*a* thus has the profile 18 in which the friction disk 10 is engaged torque-proof and thus forms an output component 19. A seal for the two pressure cavities 7, 8 through the profile 18 is formed by the disk spring 25 according to the descriptions provided regarding FIG. 1. The sealing in the portion of the output component 19 and the drive hub 26 is provided by a seal plate 39 which is connected with the output component 19 through the rivets 40 which simultaneously provide centering of the disk spring 25 and wherein the seal plate is axially applied to the flange 41.

| REFERENCE NUMERALS AND DESIGNATIONS | |
|---|---|
| 1 | Wet clutch |
| 1a | Wet clutch |
| 1b | Wet clutch |
| 1c | Wet clutch |
| 1d | Wet clutch |
| 1e | Wet clutch |
| 1f | Wet clutch |
| 2 | Housing |
| 3 | Rotation axis |
| 4 | End disk |
| 4a | Friction disk |
| 5 | Piston |

-continued

REFERENCE NUMERALS AND DESIGNATIONS

| | |
|---|---|
| 6 | Pressure cavity |
| 7 | Pressure cavity |
| 8 | Pressure cavity |
| 9 | Pass through |
| 10 | Friction disk |
| 10a | Friction disk |
| 10b | Friction disk |
| 11 | Friction surface |
| 12 | Friction surface |
| 13 | Friction surface |
| 14 | Friction surface |
| 15 | Friction liner |
| 15a | Friction liner |
| 16 | Friction liner |
| 16a | Friction liner |
| 17 | Profile |
| 18 | Profile |
| 19 | Output component |
| 20 | Input component |
| 20a | Input component |
| 20b | Disk component |
| 21 | Torsion vibration damper |
| 22 | Seal device |
| 22a | Seal device |
| 22b | Seal device |
| 22c | Seal device |
| 22d | Seal device |
| 22e | Seal device |
| 23 | Seal surface |
| 23a | Seal surface |
| 24 | Seal surface |
| 24a | Seal surface |
| 25 | Disk spring |
| 25a | Seal ring |
| 25b | Disk spring |
| 25c | Disk spring |
| 25d | Seal plate |
| 25e | Seal plate |
| 26 | Output hub |
| 27 | Intermediary space |
| 27a | Intermediary space |
| 27b | Intermediary space |
| 28 | Seal |
| 29 | Seal |
| 30 | Seal |
| 31 | Opening |
| 32 | Disk support |
| 33 | Rivet |
| 34 | Seal surface |
| 35 | Onset |
| 36 | Energy storage device |
| 37 | Onset |
| 38 | Turbine shell |
| 39 | Seal plate |
| 40 | Rivet |
| 41 | Flange |

What we claim is:

1. A wet clutch, comprising at least one friction disk (10, 10a, 10b) arranged in a first housing (2) and a second housing (2A) and loaded by an axially movable piston (5) against at least one end disk, the at least one end disk:
   separate from the first and second housings;
   fixedly connected to the first housing such that the at least one end disk cannot move relative to the first and second housings; and
   forming a support for the piston (5), wherein:
      the at least one friction disk (10, 10a, 10b) is supported radially within at least one friction surface (11, 12, 13, 14) providing a frictional engagement between the at least one friction disk (10, 10a, 10b), the piston (5) and the at least one end disk for the closed wet clutch (1, 1a, 1b, 1c, 1d, 1e, 1f);
      the support for the at least one friction disk is provided torque-proof through a profile (17) at a complementary profile (18) of a drive component (19) of the wet clutch the at least one friction surface (11, 12, 13, 14) at least in non-opened condition of the wet clutch (1, 1a, 1b, 1c, 1d, 1e, 1f) defines two pressure cavities (7, 8) so that a forced pressure medium flow is run over the at least one friction surface (11, 12, 13, 14) by adjusting variable pressures of the pressure medium; and,
      a leakage flow between the two pressure cavities (7, 8) over the profiles (17, 18) is limited by at least one seal device located radially inward of the at least one end disk.

2. The wet clutch according to claim 1, wherein the drive component (19) is formed by an input component (20, 20a) of a torsion vibration damper (21).

3. The wet clutch according to claim 2, wherein the at least one seal device is arranged between the input component (20, 20a) and the at least one friction disk (10, 10b).

4. The wet clutch according to claim 2, wherein the at least one seal device is formed by a seal plate (25e) which is centered on the input component (20) and axially clamped against the input component and forms a seal surface (34) towards the at least one friction disk (10).

5. The wet clutch according to claim 2, wherein a seal plate (39) is provided between the input component (20a) and an output hub (26) where the seal plate is connected with the input component (20a).

6. The wet clutch according to claim 1, wherein the drive component (19) is formed by a disk support (32).

7. The wet clutch according to claim 6, wherein the at least one seal device is formed from a seal plate (25d) which is attached between the disk support (32) and an input component (20) and forms a seal surface (34) towards the at least one friction disk (10).

8. The wet clutch according to claim 1, wherein the at least one seal device is arranged between an output component (19) and the at least one friction disk (10, 10b).

9. The wet clutch according to claim 1 wherein:
   the at least one end disk includes first and second end disks arranged on an input side and on an output side of the wet clutch (1b, 1c), respectively;
   the first end disk is connected on the radial outside torque-proof with the first housing (2) includes a first seal device from the at least one seal device disposed radially outward of the at least one friction surface; and,
   a second seal device from the at least one seal device is disposed radially inward of the at least one friction surface.

10. The wet clutch according to claim 9, wherein the second seal device is provided for plural input side friction disks between the input side friction disks.

11. The wet clutch according to claim 1, wherein the at least one end disk is sealed relative to the housing (2).

12. A wet clutch, comprising:
   a first cover arranged to receive a torque input;
   a second cover directly connected to the first cover;
   an output hub;
   an axially displaceable piston plate with a radially outer portion sealed against the first cover;
   an end plate permanently connected to the first cover and forming an input for the wet clutch;
   an output component in contact with the output hub;
   a friction disk:
      connected to the output component to rotate in unison with the output component; and, including at least a portion axially disposed between the piston plate and the end plate; and,
first and second friction surfaces;
a first pressure cavity at least partially formed by the piston plate and the output component;
a second pressure cavity at least partially formed by the end plate and the output component; and,
at least one seal device in contact with the output component, wherein:
the output component is free of openings from a point of contact with the friction disk to the output hub; and,
when the wet clutch is closed:
fluid flow between the first and second pressure cavities is enabled past the first and second friction surfaces; and,
the at least one seal device at least partially blocks fluid flow between the first and second pressure cavities.

13. A wet clutch, comprising:
a first cover arranged to receive a torque input;
a second cover directly connected to the first cover;
an axially displaceable piston plate with a radially outer portion sealed against the first cover;
an end plate permanently connected to the first cover and forming an input for the wet clutch;
an output component;
a friction disk:
    connected to the output component to rotate in unison with the output component; and,
    including at least a portion axially disposed between the piston plate and the end plate; and,
    first and second friction surfaces;
a first pressure cavity at least partially formed by the piston plate and the output component;
a second pressure cavity at least partially formed by the end plate and the output component; and,
at least one seal device in contact with the output component, wherein when the wet clutch is closed, flow path between the first and second pressure cavities is blocked except past the first and second friction surfaces.

* * * * *